United States Patent
Watanabe (10) Patent No.: US 10,861,458 B2
(45) Date of Patent: Dec. 8, 2020

(54) RESPONSE SENTENCE GENERATION APPARATUS, METHOD AND PROGRAM, AND VOICE INTERACTION SYSTEM

(71) Applicant: TOYOTA JIDOSHA KABUSHIKI KAISHA, Toyota (JP)

(72) Inventor: Narimasa Watanabe, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 16/185,033

(22) Filed: Nov. 9, 2018

(65) Prior Publication Data

US 2019/0164551 A1 May 30, 2019

(30) Foreign Application Priority Data

Nov. 28, 2017 (JP) ................................. 2017-228234

(51) Int. Cl.
*G10L 15/22* (2006.01)
*G10L 25/63* (2013.01)
(Continued)

(52) U.S. Cl.
CPC .............. *G10L 15/22* (2013.01); *G06F 3/167* (2013.01); *G06F 40/242* (2020.01); *G06F 40/268* (2020.01); *G06F 40/30* (2020.01); *G06F 40/56* (2020.01); *G10L 15/1807* (2013.01); *G10L 15/26* (2013.01); *G10L 25/63* (2013.01); *G06N 3/008* (2013.01); *G10L 13/00* (2013.01);
(Continued)

(58) Field of Classification Search
CPC ....... G10L 15/02; G10L 15/04; G10L 15/063; G10L 2015/088; G10L 15/22; G10L 2015/221; G10L 2015/223; G10L 2015/225; G10L 15/26; G10L 15/265; G10L 25/63; G10L 15/1807; G10L 15/1822; G10L 25/90; G06F 3/167; G06F 40/242; G06F 40/268; G06F 40/30; G06F 40/56; G06N 3/008
See application file for complete search history.

(56) References Cited

U.S. PATENT DOCUMENTS 5,907,826 A * 5/1999 Takagi ................ G10L 15/1807
704/208
5,918,222 A * 6/1999 Fukui ..................... G06Q 10/10
(Continued)

FOREIGN PATENT DOCUMENTS

| JP | 2009-193448 | 8/2009 |
|---|---|---|
| JP | 2016-024384 | 2/2016 |
| JP | 2016-036500 | 3/2016 |

*Primary Examiner* — Eric Yen
(74) *Attorney, Agent, or Firm* — Oblon, McClelland, Maier & Neustadt, L.L.P.

(57) ABSTRACT

A response sentence generation apparatus includes a conversion device for converting an input voice of a user into text information, an extraction device for extracting prosodic information from the input voice, a specifying device for specifying an emotion occurrence word indicating an occurrence of an emotion of the user based on the text information and the prosodic information, and a generation device for selecting a character string including the specified emotion occurrence word from the text information and generating a response sentence by performing predetermined processing on the selected character string.

6 Claims, 4 Drawing Sheets

(51) Int. Cl.
  *G06F 3/16* (2006.01)
  *G06F 40/242* (2020.01)
  *G06F 40/56* (2020.01)
  *G10L 15/26* (2006.01)
  *G06F 40/268* (2020.01)
  *G06F 40/30* (2020.01)
  *G10L 15/18* (2013.01)
  *G06N 3/00* (2006.01)
  *G10L 13/00* (2006.01)
  *G10L 25/90* (2013.01)
  *G10L 15/08* (2006.01)

(52) U.S. Cl.
  CPC .......... *G10L 15/1822* (2013.01); *G10L 25/90* (2013.01); *G10L 2015/088* (2013.01); *G10L 2015/221* (2013.01); *G10L 2015/225* (2013.01)

(56) References Cited

U.S. PATENT DOCUMENTS

| | | | |
|---|---|---|---|
| H2189 H * | 5/2007 | Rao | G06F 16/685 704/270.1 |
| 8,214,214 B2 * | 7/2012 | Bennett | G10L 17/26 704/254 |
| 10,141,010 B1 * | 11/2018 | Nichols | H04N 21/45457 |
| 2001/0032078 A1 * | 10/2001 | Fukada | G10L 15/1807 704/258 |
| 2003/0023444 A1 * | 1/2003 | St. John | H04M 3/382 704/270.1 |
| 2003/0167167 A1 * | 9/2003 | Gong | G10L 15/22 704/250 |
| 2003/0216917 A1 * | 11/2003 | Sakunaga | H04M 3/527 704/251 |
| 2004/0186726 A1 * | 9/2004 | Grosvenor | H04N 5/77 704/275 |
| 2005/0216257 A1 * | 9/2005 | Tanabe | G10L 15/26 704/200 |
| 2007/0136062 A1 * | 6/2007 | Braunschweiler | G10L 15/02 704/253 |
| 2008/0300872 A1 * | 12/2008 | Basu | H04N 7/147 704/235 |
| 2009/0048843 A1 * | 2/2009 | Nitisaroj | G10L 13/10 704/260 |
| 2009/0150155 A1 * | 6/2009 | Endo | G10L 17/00 704/255 |
| 2009/0210411 A1 | 8/2009 | Murata et al. | |
| 2010/0036660 A1 | 2/2010 | Bennett | |
| 2012/0232886 A1 * | 9/2012 | Capuozzo | G10L 15/22 704/9 |
| 2013/0173269 A1 | 7/2013 | Adler et al. | |
| 2013/0297308 A1 * | 11/2013 | Koo | G06F 16/164 704/235 |
| 2014/0114655 A1 * | 4/2014 | Kalinli-Akbacak | G10L 25/63 704/231 |
| 2014/0220526 A1 * | 8/2014 | Sylves | G06Q 30/0201 434/238 |
| 2014/0222430 A1 * | 8/2014 | Rao | G10L 15/04 704/254 |
| 2014/0278408 A1 * | 9/2014 | Park | G06F 3/0488 704/235 |
| 2016/0019915 A1 * | 1/2016 | Khan | G10L 19/018 704/239 |
| 2016/0027452 A1 * | 1/2016 | Kalinli-Akbacak | G10L 25/63 704/240 |
| 2016/0042749 A1 * | 2/2016 | Hirose | G10L 15/22 704/235 |
| 2016/0071510 A1 * | 3/2016 | Li | G10L 13/027 704/260 |
| 2016/0118060 A1 * | 4/2016 | Yadav | G06F 3/04842 704/257 |
| 2016/0133251 A1 * | 5/2016 | Kadirkamanathan | G06F 40/216 704/9 |
| 2017/0053323 A1 * | 2/2017 | Steelberg | G06F 40/30 |
| 2019/0051302 A1 * | 2/2019 | Gonzalez | G10L 15/1815 |
| 2019/0272823 A1 * | 9/2019 | Baldwin | G06F 40/30 |

* cited by examiner

RESPONSE SENTENCE GENERATION APPARATUS, METHOD AND PROGRAM, AND VOICE INTERACTION SYSTEM

CROSS REFERENCE TO RELATED APPLICATIONS

This application is based upon and claims the benefit of priority from Japanese patent application No. 2017-228234, filed on Nov. 28, 2017, the disclosure of which is incorporated herein in its entirety by reference.

BACKGROUND

The present disclosure relates to a response sentence generation apparatus, a method and a program, and a voice interaction system.

Japanese Unexamined Patent Application Publication No. 2009-193448 discloses a technique related to an interactive system that analyzes contents of a human speech, generates a response sentence for performing parroting (i.e., exact repeating of the human's speech as a parrot does, hereinafter also referred to simply as "parroting"), and outputs the generated response sentence as a voice. In the technique disclosed in Japanese Unexamined Patent Application Publication No. 2009-193448, a response sentence is generated by extracting expressions representing an intention and/or a subjective idea from a result of an analysis on text data representing contents of a speech based on a list of special expressions prepared in advance and adding a certain responsive response (i.e., a responsive sound to express understanding and/or agreement) to the extracted expressions.

SUMMARY

The present inventors have found the following problem. As described above, in the technique disclosed in Japanese Unexamined Patent Application Publication No. 2009-193448, expressions to be extracted are specified based on matching between them and expressions defined in the special expression list on the text-data basis. However, there is a problem that even if an expression formally matches one in the special expression list on the text-data basis, there is a possibility that the matched expression may not be consistent with actual interest of a speaker. For example, there is a possibility that an expression filled with an emotion uttered by a speaker in the content of the speech may not be specified as an expression to be extracted. Further, in such a case, a response sentence is not consistent with the interest of the speaker.

The present disclosure has been made to solve the above-described problem and an object thereof is to provide a response sentence generation apparatus, a method and a program, and a voice interaction system for generating a response sentence including contents tailored to user's interest by parroting.

A first exemplary aspect is a response sentence generation apparatus including: conversion means for converting an input voice of a user into text information; extraction means for extracting prosodic information from the input voice; specifying means for specifying an emotion occurrence word indicating an occurrence of an emotion of the user based on the text information and the prosodic information; and generation means for selecting a character string including the specified emotion occurrence word from the text information and generating a response sentence by performing predetermined processing on the selected character string.

As described above, in this embodiment, a character string in text information corresponding to a part in which a user expresses an emotion is specified as an emotion occurrence word by using prosodic information extracted from voice data representing contents of user's speech. Further, a response sentence is generated by using the emotion occurrence word as a core of the response sentence. Therefore, it is possible to generate a response sentence including contents tailored to user's interest by parroting and respond the generated response sentence as voice data to the user. Therefore, it is possible to make a response that gives a user a feeling that the user is attentively listened to (hereinafter also referred to as an "attentively-listened feeling").

Further, the extraction means preferably extracts an emphasized voice in the input voice as the prosodic information by performing a fundamental-frequency analysis on the input voice, and the specifying means preferably specifies a character string corresponding to the emphasized voice indicated by the prosodic information as the emotion occurrence word from the text information. In this way, it is possible to appropriately extract an emphasized part from the voice data and to generate a more appropriate response sentence.

Further, the conversion means preferably associates information on a time at which each sound in the input voice occurs with a respective character in the text information, the extraction means preferably includes information on a time at which each sound in the emphasized voice has occurred in the prosodic information and extracts it together with the prosodic information, and the specifying means preferably specifies a character string corresponding to the information on the time included in the prosodic information as the emotion occurrence word from the text information. In this way, it is possible to accurately specify a character string corresponding to an emphasized voice from text information corresponding to an input voice and generate a more appropriate response sentence.

Further, the response sentence generation apparatus preferably further includes dictionary information in which a candidate for the emotion occurrence word is registered in advance, and the specifying means preferably specifies the emotion occurrence word while further taking the dictionary information into consideration. In this way, even when a plurality of emphasized expressions are specified based on the prosodic information, it is possible to specify a more appropriate emotion occurrence word. Therefore, it is possible to improve accuracy of a parroting response sentence.

Alternatively, the response sentence generation apparatus preferably further includes a word emotion inference model generated by machine learning of other input voices, and the specifying means preferably specifies the emotion occurrence word while further taking the word emotion inference model into consideration. In this way, even when a plurality of emphasized expressions are specified based on the prosodic information, it is possible to specify a more appropriate emotion occurrence word. Therefore, it is possible to improve accuracy of a parroting response sentence.

A second exemplary aspect is a response sentence generation method including: converting an input voice of a user into text information; extracting prosodic information from the input voice; specifying an emotion occurrence word indicating an occurrence of an emotion of the user based on the text information and the prosodic information; and selecting a character string including the specified emotion occurrence word from the text information and generating a response sentence by performing predetermined processing on the selected character string.

A third exemplary aspect is a response sentence generation program for causing a computer to execute: a process of converting an input voice of a user into text information; a process of extracting prosodic information from the input voice; a process of specifying an emotion occurrence word indicating an occurrence of an emotion of the user based on the text information and the prosodic information; and a process of selecting a character string including the specified emotion occurrence word from the text information and generating a response sentence by performing predetermined processing on the selected character string. These second and third aspect are also expected to provide advantageous effects similar to those of the first aspect.

A fourth exemplary aspect is a voice interaction system including: voice input means for receiving an input voice from a user; conversion means for converting the input voice into text information; extraction means for extracting prosodic information from the input voice; specifying means for specifying an emotion occurrence word indicating an occurrence of an emotion of the user based on the text information and the prosodic information; generation means for selecting a character string including the specified emotion occurrence word from the text information and generating a response sentence by performing predetermined processing on the selected character string; and voice output means for converting the generated response sentence into a voice and outputting the voice.

As described above, in the fourth aspect, various means are disposed in a plurality of apparatus in a distributed manner. Therefore, for example, when they are distributed between an interactive robot that directly interacts with a user and an external server, it is possible to reduce a processing burden on the interactive robot side. Further, processing performance can be easily improved on the external server side. Therefore, in the fourth aspect, in addition to advantageous effects similar to those of the first aspect, the above-described additional advantageous effect can be obtained.

According to the present disclosure, it is possible to provide a response sentence generation apparatus, a method and a program, and a voice interaction system for generating a response sentence including contents tailored to user's interest by parroting.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure including the above-described aspects is applied are described hereinafter in detail with reference to the drawings. The same reference symbols are assigned to the same components throughout the drawings and duplicated explanations are omitted as appropriate for clarifying the explanation.

First Embodiment According to Disclosure

In a chatting-type interactive robot, utterances (or speeches) indicating that the interactive robot is attentively listening to a user are effective because they can provide naturalness to the chatting. Among these utterances (or speeches), a parroting response (i.e., a response by parroting) is a type of response that is made by directly using words and/or phrases in a user's speech. For example, when a user says that "It was hot yesterday.", it may be desirable that the interactive robot responds to the user's speech by saying "It was hot." as a parroting response.

Note that in related-art voice interaction systems, parroting sentences have been used as responses to fill up the time before actual response sentences are generated. Therefore, in most of cases, processes for generating parroting sentences have been simple in the past. However, since parroting is one of important responses in a chatting-type interactive robot as described above, it has become worthwhile to perform more complicated language processing for the parroting as compared to the past.

Therefore, in this embodiment, an expressive word in which a change in user's emotion appears is inferred from contents of user's speech and a parroting response sentence including the inferred expressive word is generated. That is, when a parroting response sentence is generated, a word tailored to the user's interest is selected. By doing so, it is possible to make a parroting response that may give a fine attentively-listened feeling to the user.

Figure 1:
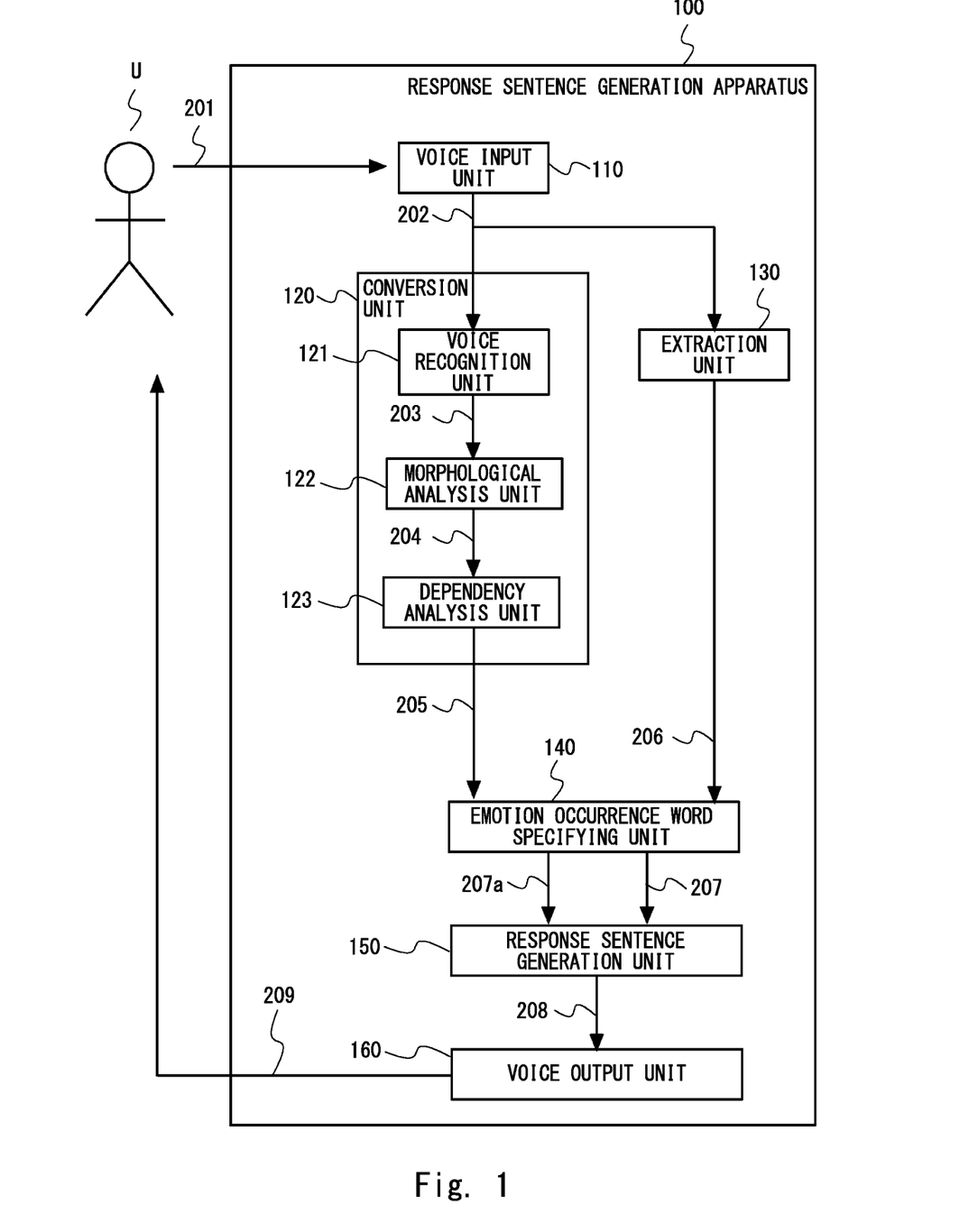
FIG. 1 is a block diagram showing a configuration of a response sentence generation apparatus according to a first embodiment of the present disclosure.

FIG. 1 is a block diagram showing a configuration of a response sentence generation apparatus 100 according to a first embodiment of the present disclosure. The response sentence generation apparatus 100 receives contents of a speech uttered by a user U as an input voice 201, specifies a word/phrase close to (i.e., substantially expressing) an interest of the user U from the contents of the speech, generates a response sentence including the specified word/phrase, and outputs the generated response sentence as an output voice 209. In this way, the response sentence generation apparatus 100 interacts (i.e., has a conversation) with the user U. Therefore, the response sentence generation apparatus 100 can be regarded as an example of a voice interaction system. Further, the response sentence generation apparatus 100 according to this embodiment can be installed in, for example, a robot, a PC (Personal Computer), a mobile terminal (a smartphone, a tablet, etc.), or the like.

Note that the response sentence generation apparatus 100 is formed by, for example, hardware mainly using a microcomputer including a CPU (Central Processing Unit) that performs arithmetic processing and so on, a memory that is composed of a ROM (Read Only Memory) and a RAM (Random Access Memory), and stores an arithmetic program executed by the CPU and the like, an interface unit (I/F) that externally receives and outputs signals, and so on. The CPU, the memory, and the interface unit are connected with each other through a data bus or the like.

The response sentence generation apparatus 100 includes, for example, a voice input unit 110, a conversion unit 120, an extraction unit 130, an emotion occurrence word specifying unit 140, a response sentence generation unit 150, and a voice output unit 160. The voice input unit 110 receives an input voice 201 from the user U through a microphone or the like, and outputs an input voice 202 to the conversion unit 120 and the extraction unit 130. The voice input unit 110 is an example of the voice input means.

The conversion unit 120 converts the input voice 202 into text information. The conversion unit 120 is an example of the conversion means. The conversion unit 120 outputs an analysis result 205 that is obtained by performing at least a predetermined analysis on converted text information or the text information to the emotion occurrence word specifying unit 140. Further, the conversion unit 120 associates information on a time at which each sound in the input voice 202 has occurred with a respective character in the text information. Note that the information on the time (hereinafter also referred to as time information) is, for example, an elapsed time from the start of the input voice 202 to the occurrence of each sound, or information on a point of time at which each sound has occurred. That is, the time information is information by which a position of each character in the text information can be specified.

Note that the conversion unit 120 includes a voice recognition unit 121, a morphological analysis unit 122, and a dependency analysis unit 123. For example, the voice recognition unit 121 digitizes the voice information, i.e., the input voice 202. The voice recognition unit 121 detects a speech section from the digitized information and performs voice recognition by performing pattern matching on voice information in the detected speech section with reference to a statistical language model or the like.

Note that the statistical language model is, for example, a probability model for calculating an appearance probability of a linguistic expression such as a distribution of appearances of words or a distribution of words that appear following a certain word, obtained by learning connection probabilities on a morphemic basis. The statistical language model is stored in advance in a storage unit or the like (not shown). The voice recognition unit 121 outputs text information 203, which is a result of the voice recognition, to the morphological analysis unit 122.

The morphological analysis unit 122 divides the text information 203 corresponding to the input voice 202 into a plurality of morphemes. Further, the morphological analysis unit 122 adds a type of part of speech (a noun, an adjective, a verb, an adverb, etc.) to each of the morphemes and thereby generates morphemic information with part-of-speech information incorporated therein. The morphological analysis unit 122 analyzes the construction of the text information 203 recognized (i.e., obtained) by the voice recognition unit 121. For example, the morphological analysis unit 122 performs a morphological analysis or the like on the character-string information, i.e., the text information 203, by using an ordinary morphological analyzer, and interprets the meaning of the character-string information. The morphological analysis unit 122 outputs an analysis result 204 to the dependency analysis unit 123.

The dependency analysis unit 123 analyzes dependent relations among the morpheme information items in the analysis result 204 and outputs an analysis result 205 (including morphemic information, dependency information, text information on recognition results, etc.) to the emotion occurrence word specifying unit 140.

The extraction unit 130 is an example of the extraction means. The extraction unit 130 extracts prosodic information 206 from the input voice 202. Specifically, the extraction unit 130 extracts an emphasized voice in the input voice 202 as prosodic information 206 by performing a fundamental-frequency analysis on the input voice 202. Note that the prosodic information 206 is information indicating an intonation, a stress, a strength of an accent, etc. in the input voice 202. However, in this example, it is assumed that the prosodic information 206 is information indicating, in particular, a position of a sound that the user U has emphasized in comparison to other sounds in the input voice 202. Note that the extraction unit 130 may include a plurality of parts as emphasized parts in the prosodic information 206.

For example, the extraction unit 130 calculates a ratio between the fundamental frequency of the input voce immediately before (one sample before) the current input voice and that of the current input voice. Then, when the extraction unit 130 determines that the current fundamental frequency has increased by a certain value or larger, it determines that the current input voice corresponds to a part in which the voice is emphasized. Alternatively, the extracting unit 130 calculates a range of fundamental frequencies based on a history of speeches in the past. Then, when the fundamental frequency of the current input voice exceeds this range, it determines that the current input voice corresponds to a part in which the voice is emphasized.

Further, the extraction unit 130 includes information on a time at which each sound in the emphasized voice has occurred in the prosodic information and extracts it together with the prosodic information 206. It is assumed that the time information in this example is information by which a position of each sound in the input voice 202 can be specified. Therefore, it can be said that the prosodic information 206 includes time information corresponding to a sound that the user U has emphasized in comparison to other sounds in the input voice 202. Note that a publicly-known technique related to prosodic feature extractions can be applied to the extraction unit 130.

The emotion occurrence word specifying unit 140 is an example of the specifying unit. The emotion occurrence word specifying unit 140 specifies an emotion occurrence word 207 indicating an occurrence of an emotion of the user U based on the analysis result 205, which is the text information, and the prosodic information 206. Specifically, the emotion occurrence word specifying unit 140 specifies a character string corresponding to an emphasized voice indicated by the prosodic information 206 as an emotion occurrence word 207 from the analysis result 205. More specifically, the emotion occurrence word specifying unit 140 specifies a character string corresponding to time information included in the prosodic information 206 as an emotion occurrence word 207 from the analysis result 205. The emotion occurrence word specifying unit 140 outputs the specified emotion occurrence word 207 and text information 207a corresponding to the analysis result 205 to the response sentence generation unit 150.

The response sentence generation unit 150 is an example of the generation unit. The response sentence generation unit 150 selects a character string including the specified emotion occurrence word 207 from the text information 207a and generates a response sentence 208 by performing predetermined processing on the selected character string. For example, the response sentence generation unit 150 selects a predicate term including the emotion occurrence word 207 from the text information 207a. In particular, the response sentence generation unit 150 preferably selects a predicate term including the emotion occurrence word 207 while taking morphemic information and/or dependency information included in the text information 207a into consideration. In this case, the response sentence generation unit 150 may select a plurality of predicate terms. Further, as an example of the predetermined processing, the response sentence generation unit 150 may change the ending of a word or the like in the selected predicate term. Alternatively, as another example of the predetermined processing, the response sentence generation unit 150 may remove a part of the selected predicate term, and/or combine other words or phrases with the predicated term. For example, the response sentence generation unit 150 may remove a predicate part from the predicate term and thereby process it into a question form. The response sentence generation unit 150 outputs the generated response sentence 208 to the voice output unit 160. Note that the predetermined processing is not limited to the above-described examples.

The voice output unit 160 converts the response sentence 208 generated by the response sentence generation unit 150 into a voice (e.g., a speech) and outputs the obtained voice (e.g., the speech) as an output voice 209 for the user U by using a speaker or the like. The voice output unit 160 is an example of the voice output means.

Note that the response sentence generation apparatus 100 needs to include at least the conversion unit 120, the extraction unit 130, the emotion occurrence word specifying unit 140, and the response sentence generation unit 150. In this case, the response sentence generation apparatus 100 may store an input voice 202 in advance in a storage unit (not shown). Then, the conversion unit 120 and the extraction unit 130 may read out the input voice 202 from the storage unit and perform their respective processes. Further, in this case, the response sentence generation unit 150 may also store a response sentence 208 in the storage unit.

Figure 2:
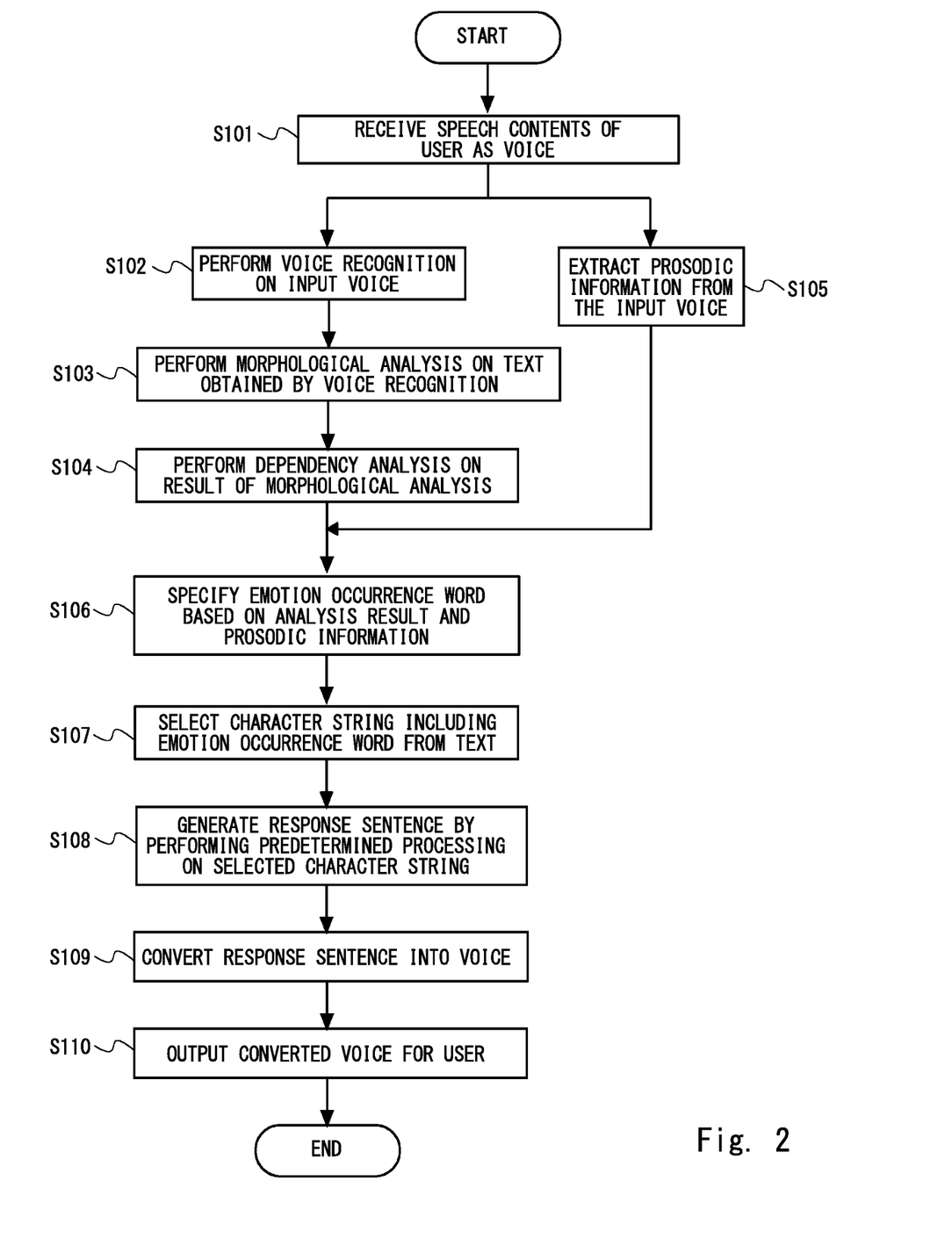
FIG. 2 is a flowchart showing a flow of a response sentence generation process according to the first embodiment of the present disclosure.

FIG. 2 is a flowchart showing a flow of a response sentence generation process according to the first embodiment of the present disclosure. Firstly, the voice input unit 110 receives contents of a speech of a user U as a voice (S101). For example, it is assumed that the user U has uttered "Traveling abroad once in a while is enjoyable."

Next, the voice recognition unit 121 performs voice recognition on an input voice 202 received from the voice input unit 110 (S102). Then, the morphological analysis unit 122 performs a morphological analysis on text information 203 obtained by the voice recognition (S103). Next, the dependency analysis unit 123 performs dependency analysis on an analysis result 204 obtained by the morphological analysis (S104).

Further, in parallel with the steps S102 to S104, the extraction unit 130 extracts prosodic information 206 from the input voice 202 (S105). In this example, it is assumed that, for example, "overseas travel" is emphasized by the user U and the prosodic information 206 contains information on a position of a sound corresponding to the "overseas travel" and its time information in the input voice 202.

After the steps S104 and S105, the emotion occurrence word specifying unit 140 specifies an emotion occurrence word 207 based on the analysis result 205 and the prosodic information 206 (S106). For example, the emotion occurrence word specifying unit 140 specifies a character string "overseas travel" emphasized by the user U as the emotion occurrence word 207 from the analysis result 205.

Then, the response sentence generation unit 150 selects a character string including the emotion occurrence word 207 from the text information 207a (S107). For example, the response sentence generation unit 150 selects "overseas travel is enjoyable" as a predicate term including the emotion occurrence word 207 from the text information 207a. Next, the response sentence generation unit 150 generates a response sentence 208 by performing predetermined processing on the selected character string (S108). For example, the response sentence generation unit 150 generates a response sentence "Is overseas travel?" that is obtained by converting the predicate term "overseas travel is enjoyable" into a question form by removing a predicate from the predicate term.

After that, the voice output unit 160 converts the response sentence 208 into a voice (e.g., a speech) (S109). For example, voice data corresponding to the response sentence "Is overseas travel?" is generated. Then, the voice output unit 160 outputs the converted output voice 209 for the user U (S110). For example, the voice output unit 160 outputs a voice (e.g., a speech) "Is overseas travel?" for the user U.

In this way, the user U can receive an appropriate parroting response to the expression emphasized in his/her own speech. That is, the response sentence generation apparatus 100 according to this embodiment can generate a parroting response sentence including contents tailored to the user's interest. Therefore, the user U can have a finer attentively-listened feeling from the response sentence generation apparatus 100.

Second Embodiment According to Disclosure

A second embodiment according to the present disclosure is a modified example of the above-described first embodiment.

Figure 3:
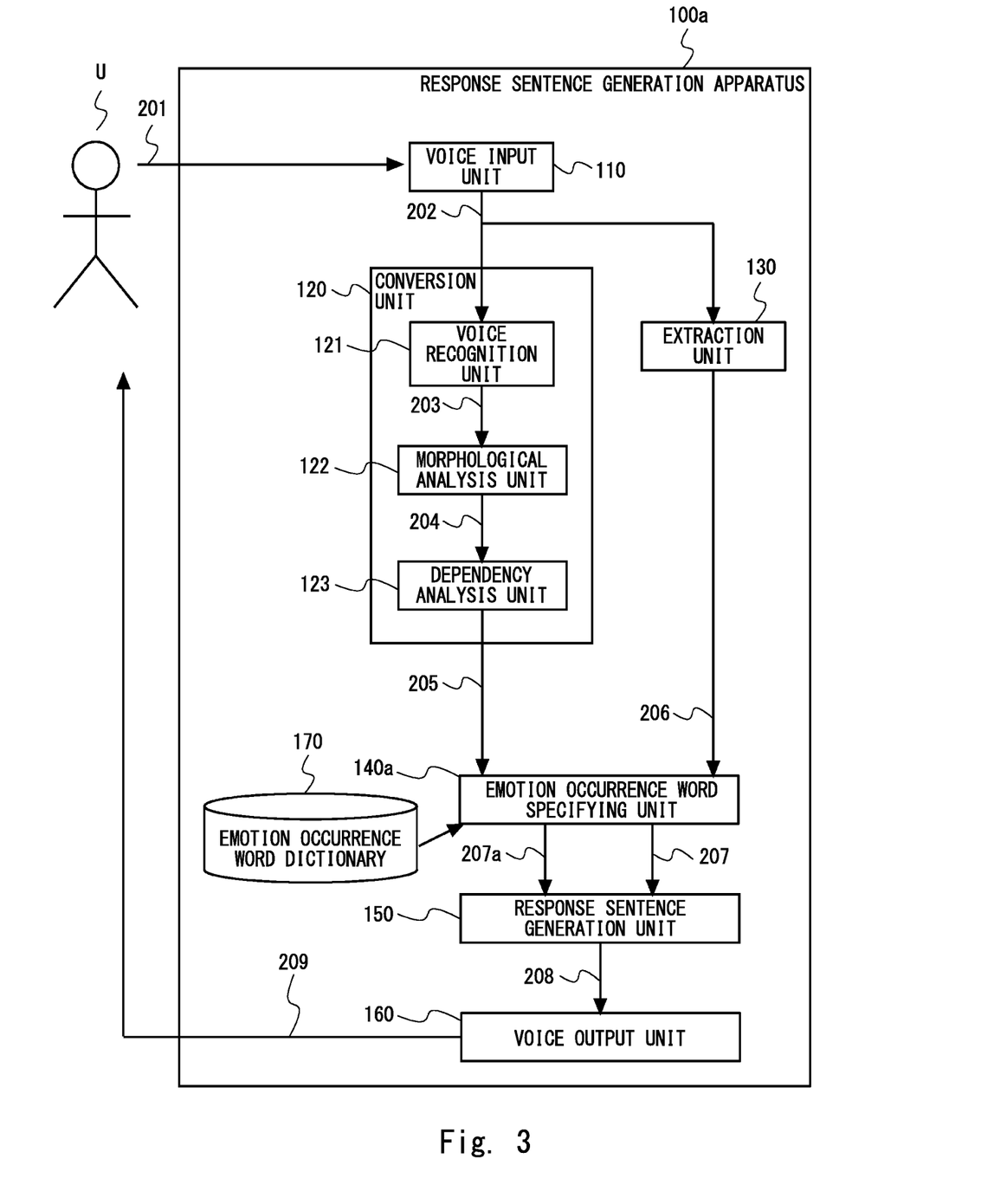
FIG. 3 is a block diagram showing a configuration of a response sentence generation apparatus according to a second embodiment of the present disclosure.

FIG. 3 is a block diagram showing a configuration of a response sentence generation apparatus 100a according to the second embodiment of the present disclosure. Compared to the above-described response sentence generation apparatus 100, the response sentence generation apparatus 100a includes an emotion occurrence word dictionary 170 as an additional component. The emotion occurrence word dictionary 170 is a database in which a candidate(s) for at least one emotion occurrence word is registered in advance as character-string information. Further, in addition to the process performed by the above-described emotion occurrence word specifying unit 140, an emotion occurrence word specifying unit 140a specifies an emotion occurrence word 207 by further taking the emotion occurrence word dictionary 170 into consideration. In this way, in the case where a plurality of parts are indicated as emphasized sounds in the prosodic information, it is possible to narrow down (i.e., reduces the number of) the parts corresponding to the emphasized sounds based on candidates for emotion occurrence words registered in the emotion occurrence word dictionary 170. Therefore, it is possible to improve accuracy of a parroting response sentence.

For example, similarly to the above-described example, it is assumed that the input voice 201 is "Traveling abroad once in a while is enjoyable" and there are two sounds "overseas travel" and "enjoyable" that have been emphasized by the user U. In this case, the extraction unit 130 includes two positions or two time information pieces or the like for specifying the two sounds "overseas travel" and "enjoyable" in the prosodic information 206. Then, the emotion occurrence word specifying unit 140a first specifies the "overseas travel" and "enjoyable" as character strings corresponding to the time information indicated by the prosodic information 206 from the analysis result 205. Next, the emotion occurrence word specifying unit 140a refers to the emotion occurrence word dictionary 170 and compares the two character strings specified in the above-described process with a candidate emotion word "enjoyable" registered in the emotion occurrence word dictionary 170. Then, the emotion occurrence word specifying unit 140a specifies "enjoyable" for which there is a match in the comparison as an emotion occurrence word 207.

After that, the response sentence generation unit 150 selects a predicate term "overseas travel is enjoyable" including the specified emotion occurrence word "enjoyable" from the text information 207a. Then, the response sentence generation unit 150 generates, for example, a response sentence "It is enjoyable, isn't it?" from the predicate term "overseas travel is enjoyable" by leaving the emotion occurrence word "enjoyable" and changing the ending of the word.

As described above, in the second embodiment, an emotion occurrence word is specified by taking the emotion occurrence word dictionary into consideration. Therefore, even when there are a plurality of candidate emotion occurrence words, it is possible to accurately specify an emotion occurrence word. Further, it is possible to generate an appropriate parroting response sentence according to the expression emphasized by the user while taking the specified emotion occurrence word into consideration.

Note that a word emotion inference model may be used in place of the emotion occurrence dictionary 170 in the second embodiment. Note that the word emotion inference model is an inference model for emotion occurrence words that is generated in advance by machine learning of other input voices. In this case, the emotion occurrence word specifying unit 140a specifies an emotion occurrence word 207 by further taking the word emotion inference model into consideration in addition to the above-described process performed by the emotion occurrence word specifying unit 140. In this way, it is possible to improve accuracy of a parroting response sentence.

Note that a proper-noun database may be used in place of the emotion occurrence dictionary 170 in the second embodiment. Note that the proper-noun database is a database in which at least one proper noun is registered in advance as character-string information. In this case, the emotion occurrence word specifying unit 140a specifies an emotion occurrence word 207 by further taking the proper-noun database into consideration in addition to the above-described process performed by the emotion occurrence word specifying unit 140. In this way, it is possible to improve accuracy of a parroting response sentence.

Further, at least two of the emotion occurrence word dictionary 170, the word emotion inference model, and the proper-noun database may be used in combination in the second embodiment. In this way, it is possible to improve accuracy of a parroting response sentence even further.

Third Embodiment According to Disclosure

A third embodiment according to the present disclosure is a modified example of the above-described first or second embodiment. In the third embodiment, an interactive robot has only a function of exchanging voices (e.g., speeches) between the interactive robot and a user, and a function of communicating with an external computer. Meanwhile, the external computer includes a part of the configuration of the above-described response sentence generation apparatus 100 or 100a.

Figure 4:
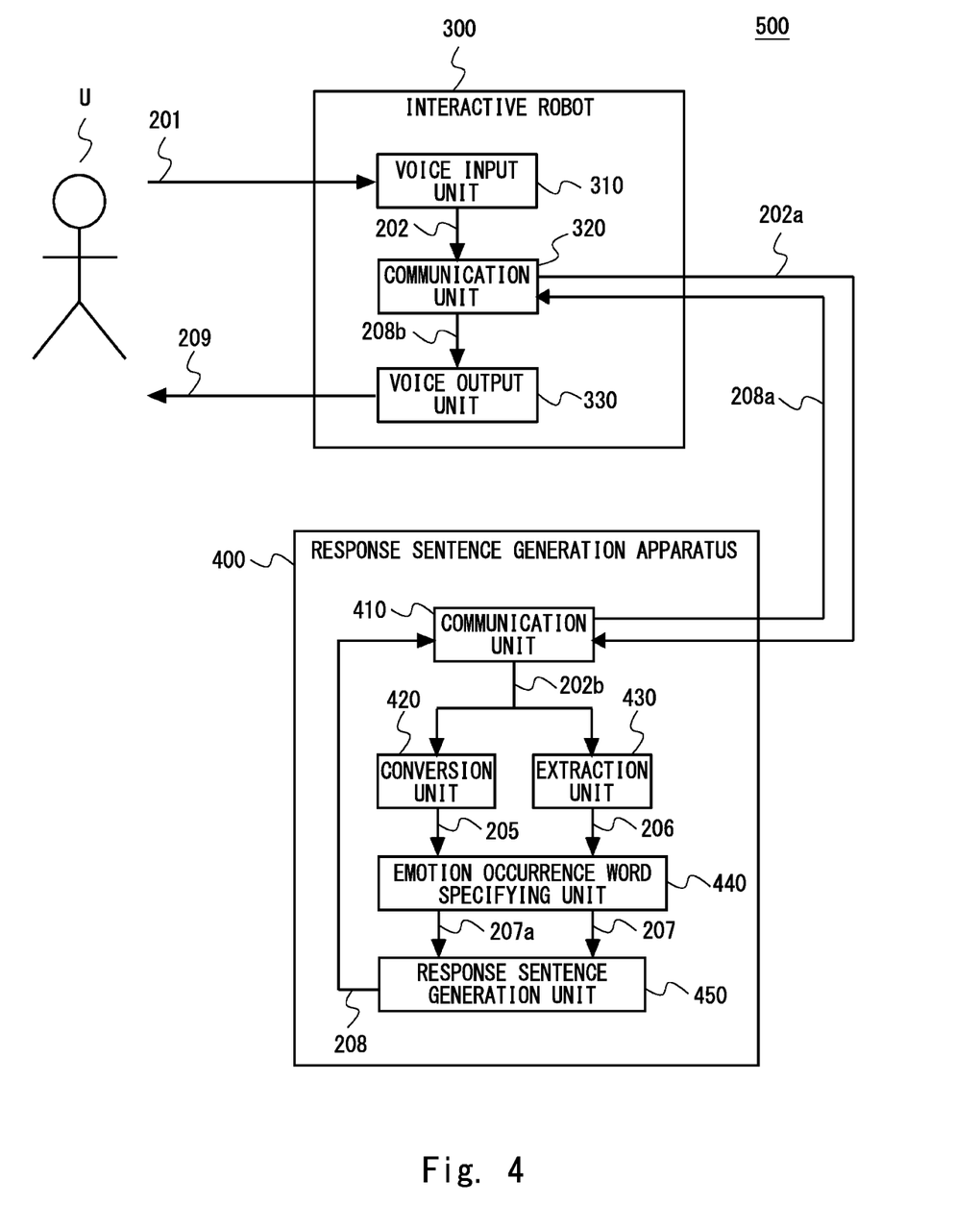
FIG. 4 is a block diagram showing an overall configuration of a voice interaction system according to a third embodiment of the present disclosure.

FIG. 4 is a block diagram showing an overall configuration of a voice interaction system 500 according to the third embodiment of the present disclosure. The voice interaction system 500 is configured so that a user U can interact (i.e., have a conversation) with an interactive robot 300. It should be noted that the interactive robot 300 is configured to request an external response sentence generation apparatus 400 to generate a parroting response sentence to a speech uttered by the user U. For example, the interactive robot 300 and the response sentence generation apparatus 400 are connected to each other through a communication network such as LTE (Long Term Evolution) and can perform data communication with each other.

The interactive robot 300 needs to have at least a minimum configuration necessary for performing voice interactions with the user U. Note that the interactive robot 300 may have functions equivalent to those of publicly-known interactive robots. Further, the interactive robot 300 may have a function of generating ordinary response sentences for interacting (i.e., having a conversation) with the user U.

The interactive robot 300 includes, for example, a voice input unit 310, a communication unit 320, and a voice output unit 330. The voice input unit 310 and the voice output unit 330 have functions equivalent to those of the above-described voice input unit 110 and the voice output unit 160, respectively. However, the voice input unit 310 outputs an input voice 201 received from the user U to the communication unit 320 as an input voice 202. Further, the voice output unit 330 converts a response sentence 208b received from the communication unit 320 into a voice (e.g., a speech) and outputs the voice (e.g., the speech) for the user U as an output voice 209.

The communication unit 320 transmits/receives communication data through, for example, wireless communication. The communication unit 320 transmits the input voice 202 as communication data 202a to the response sentence generation apparatus 400 through a network. Further, the communication unit 320 receives communication data 208a from the response sentence generation apparatus 400 through the network. The communication unit 320 outputs a response sentence 208b included in the received communication data 208a to the voice output unit 330.

The response sentence generation apparatus 400 is an information processing apparatus such as a computer. The response sentence generation apparatus 400 is, for example, a server installed on a network. The response sentence generation apparatus 400 includes a communication unit 410, a conversion unit 420, an extraction unit 430, an emotion occurrence word specifying unit 440, and a response sentence generation unit 450. The conversion unit 420, the extraction unit 430, the emotion occurrence word specifying unit 440, and the response sentence generation unit 450 have functions equivalent to those of the above-described conversion unit 120, the extraction unit 130, the emotion occurrence word specifying unit 140, and the response sentence generation unit 150, respectively.

The communication unit 410 transmits/receives communication data through, for example, wireless communication or wired communication. The communication unit 410 receives communication data 202a from the interactive robot 300 through the network and outputs an input voice 202b included in the communication data 202a to the conversion unit 420 and the extraction unit 430. Further, the communication unit 410 receives a response sentence 208 output from the response sentence generation unit 450 and transmits the response sentence to the interactive robot 300 as communication data 208a.

Note that the configuration of the interactive robot 300 and the response sentence generation apparatus 400 is not limited to the above-described configuration. For example, the interactive robot 300 may include a part of the configuration of the response sentence generation apparatus 400. That is, the interactive robot 300 and the response sentence generation apparatus 400 may implement the configuration of the response sentence generation apparatus 100 or 100*a* by combing their configurations.

In this way, by distributing the processing between the interactive robot 300 and the response sentence generation apparatus 400, it is possible to reduce the processing performed by the interactive robot 300 and thereby reduce the size and weight of the interactive robot 300. Further, by enhancing the processing capability of the response sentence generation apparatus 400, the processing capability of the voice interactive system 500 can be easily improved. Therefore, the voice interaction system 500 can produce more complicated responses. Further, in the case where the main components are disposed on the interactive robot 300 side, a maintenance operator needs to visit the place where the interactive robot 300 is located when he/she maintains/inspects the voice interaction system. However, by disposing the main components on the response sentence generation apparatus 400 side, the need for the visit can be eliminated. Therefore, it is possible to reduce the personnel burden necessary for the maintenance such as maintenances/inspections.

Note that the present disclosure is not limited to the above-described embodiments, and various modifications can be made without departing the spirit and scope of the present disclosure. Although the present disclosure is described as a hardware configuration in the above-described embodiments, the present disclosure is not limited to the hardware configurations. In the present disclosure, an arbitrary process can also be implemented by causing a CPU (Central Processing Unit) to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W, DVD (Digital Versatile Disc), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A response sentence generation apparatus comprising:
at least one memory configured to store instructions; and
at least one processor configured to execute the instructions to:
convert an input voice of a user into text information;
extract prosodic information from the input voice;
specify an emotion occurrence word indicating an occurrence of an emotion of the user based on the text information and the prosodic information;
select a character string including the specified emotion occurrence word from the text information and generate a response sentence by performing predetermined processing on the selected character string;
extract an emphasized voice in the input voice as the prosodic information by performing a fundamental-frequency analysis on the input voice;
specify a character string corresponding to the emphasized voice indicated by the prosodic information as the emotion occurrence word from the text information;
associate information on a time at which every phoneme in the input voice occurs with a respective character in the text information;
include information on a time at which every phoneme in the emphasized voice has occurred in the prosodic information and extract the information on the time at which every phoneme in the emphasized voice has occurred together with the prosodic information; and
specify a character string corresponding to the information on the time included in the prosodic information as the emotion occurrence word from the text information.

2. The response sentence generation apparatus according to claim 1, further comprising dictionary information in which a candidate for the emotion occurrence word is registered in advance, wherein
the at least one processor is further configured to specify the emotion occurrence word while further taking the dictionary information into consideration.

3. The response sentence generation apparatus according to claim 1, further comprising a word emotion inference model generated by machine learning of other input voices, wherein
the at least one processor is further configured to specify the emotion occurrence word while further taking the word emotion inference model into consideration.

4. A response sentence generation method comprising:
converting an input voice of a user into text information;
extracting prosodic information from the input voice;
specifying an emotion occurrence word indicating an occurrence of an emotion of the user based on the text information and the prosodic information;
selecting a character string including the specified emotion occurrence word from the text information and generating a response sentence by performing predetermined processing on the selected character string;
extracting an emphasized voice in the input voice as the prosodic information by performing a fundamental-frequency analysis on the input voice;
specifying a character string corresponding to the emphasized voice indicated by the prosodic information as the emotion occurrence word from the text information;
associating information on a time at which every phoneme in the input voice occurs with a respective character in the text information;
including information on a time at which every phoneme in the emphasized voice has occurred in the prosodic information and extracting the information on the time at which every phoneme in the emphasized voice has occurred together with the prosodic information; and
specifying a character string corresponding to the information on the time included in the prosodic information as the emotion occurrence word from the text information.

5. A non-transitory computer readable medium storing a response sentence generation program for causing a computer to execute:
- a process of converting an input voice of a user into text information;
- a process of extracting prosodic information from the input voice;
- a process of specifying an emotion occurrence word indicating an occurrence of an emotion of the user based on the text information and the prosodic information; and
- a process of selecting a character string including the specified emotion occurrence word from the text information and generating a response sentence by performing predetermined processing on the selected character string;
- a process of extracting an emphasized voice in the input voice as the prosodic information by performing a fundamental-frequency analysis on the input voice;
- a process of specifying a character string corresponding to the emphasized voice indicated by the prosodic information as the emotion occurrence word from the text information;
- a process of associating information on a time at which every phoneme in the input voice occurs with a respective character in the text information;
- a process of including information on a time at which every phoneme in the emphasized voice has occurred in the prosodic information and extracting the information on the time at which every phoneme in the emphasized voice has occurred together with the prosodic information; and
- a process of specifying a character string corresponding to the information on the time included in the prosodic information as the emotion occurrence word from the text information.

6. A voice interaction system comprising:
- a voice input unit which receives an input voice from a user;
- at least one memory configured to store instructions; and
- at least one processor configured to execute the instructions to:
  - convert the input voice into text information;
  - extract prosodic information from the input voice;
  - specify an emotion occurrence word indicating an occurrence of an emotion of the user based on the text information and the prosodic information;
  - select a character string including the specified emotion occurrence word from the text information and generate a response sentence by performing predetermined processing on the selected character string;
  - extract an emphasized voice in the input voice as the prosodic information by performing a fundamental-frequency analysis on the input voice;
  - specify a character string corresponding to the emphasized voice indicated by the prosodic information as the emotion occurrence word from the text information;
  - associate information on a time at which every phoneme in the input voice occurs with a respective character in the text information;
  - include information on a time at which every phoneme in the emphasized voice has occurred in the prosodic information and extract the information on the time together with the prosodic information; and
  - specify a character string corresponding to the information on the time at which every phoneme in the emphasized voice has occurred included in the prosodic information as the emotion occurrence word from the text information; and
- a voice output device which converts the generated response sentence into a voice and outputs the voice.

* * * * *